United States Patent [19]

Arika et al.

[11] Patent Number: 4,664,898

[45] Date of Patent: * May 12, 1987

[54] PROCESS FOR PREPARATION OF MORDENITE TYPE ZEOLITE

[75] Inventors: Junji Arika, Tokuyama; Hiroshi Miyazaki; Keiji Itabashi, both of Shinnanyo; Michiyuki Aimoto, Kudamatsu, all of Japan

[73] Assignee: Toyo Soda Manufacturing Co., Ltd., Shinnanyo, Japan

[*] Notice: The portion of the term of this patent subsequent to Jul. 23, 2002 has been disclaimed.

[21] Appl. No.: 779,609

[22] Filed: Sep. 23, 1985

Related U.S. Application Data

[63] Continuation of Ser. No. 525,979, Aug. 24, 1983, abandoned.

[30] Foreign Application Priority Data

Oct. 20, 1982 [JP] Japan ................................ 57-182698

[51] Int. Cl.⁴ ............................................. C01B 33/28
[52] U.S. Cl. .................................... 423/329; 423/328; 423/330; 423/331; 423/332; 502/60; 502/77; 502/78

[58] Field of Search ...................... 423/328, 329, 118; 502/60, 78

[56] References Cited

U.S. PATENT DOCUMENTS

| 3,574,539 | 4/1971 | Domine et al. ..................... 423/328 |
| 3,714,366 | 1/1973 | Fukuda et al. ..................... 423/329 |
| 4,530,824 | 7/1985 | Arika et al. ......................... 423/328 |
| 4,562,055 | 12/1985 | Arika et al. ......................... 423/329 |

FOREIGN PATENT DOCUMENTS 1119962 7/1968 United Kingdom ................ 423/329

OTHER PUBLICATIONS

Barber "J. Chemical Society", 1948, pp. 2158-2163.

Primary Examiner—John Doll
Assistant Examiner—Jackson Leeds
Attorney, Agent, or Firm—Cushman, Darby & Cushman

[57] ABSTRACT

A mordenite type zeolite having a high purity and a high $SiO_2/Al_2O_3$ molar ratio is prepared without using an organic or inorganic mineralizer, by a process wherein a homogeneous aluminosilicate containing 3 to 14% by weight, expressed in terms of $Al_2O_3$ (calculated as the anhydride), of aluminum is crystallized in an aqueous solution of an alkali metal hydroxide.

2 Claims, 2 Drawing Figures

X 1000

X 1000

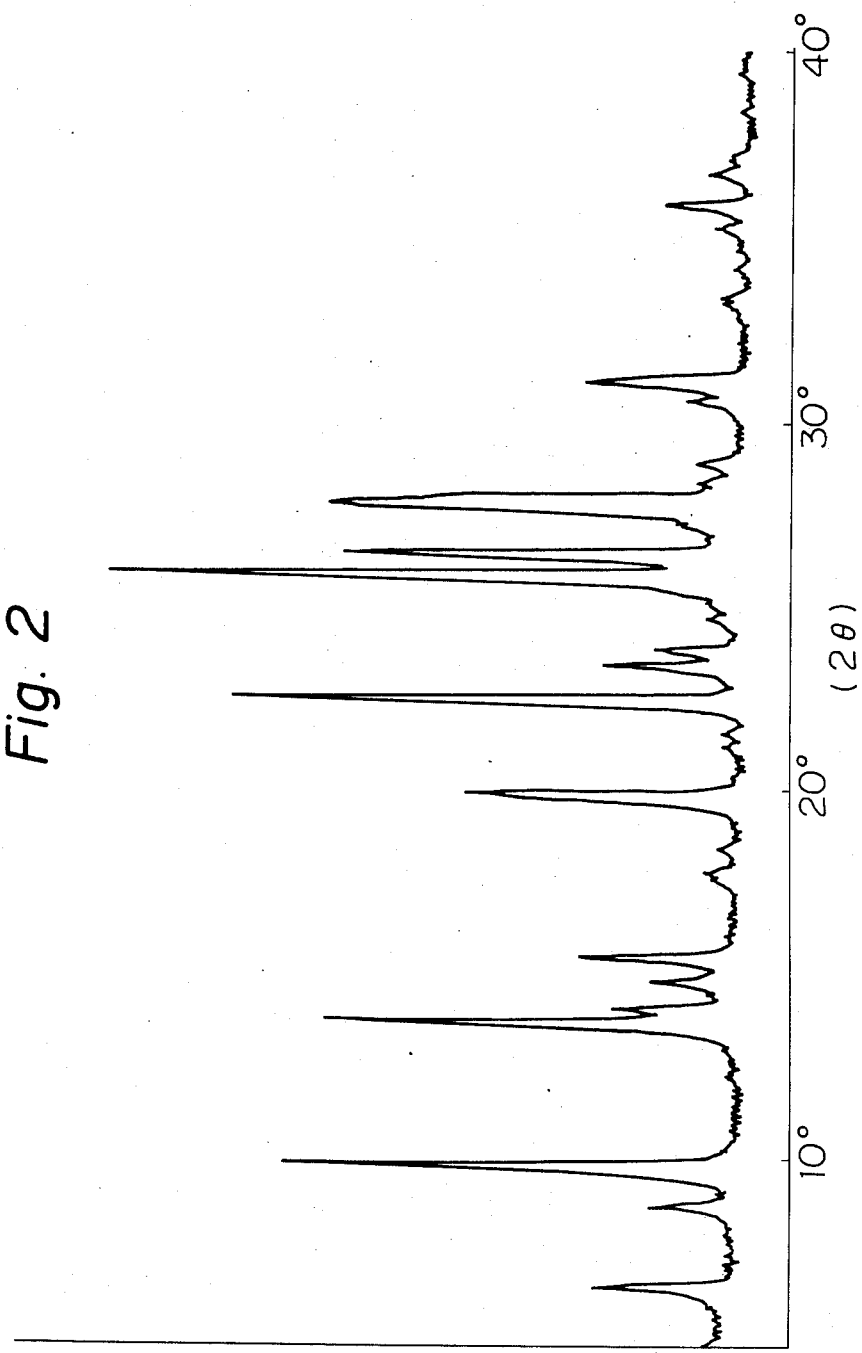

PROCESS FOR PREPARATION OF MORDENITE TYPE ZEOLITE

This is a continuation of application Ser. No. 525,979, filed Aug. 24, 1983 which was abandoned upon the filing thereof.

BACKGROUND OF THE INVENTION

(1) Field of the Invention

This invention relates to a process for the preparation of a mordenite type zeolite having 5-membered rings of oxygen atoms. More particularly, it relates to a process in which a mordenite type zeolite having a high purity and a high $SiO_2/Al_2O_3$ molar ratio can easily be prepared with a good reproducibility without using an organic or inorganic mineralizer.

(2) Description of the Prior Art

As is seen from the fact that the term "zeolite" is derived from the Greek word "zein" (boiling stone), the zeolite is a crystalline aluminosilicate containing zeolitic water, which has an oxide molar composition represented by the following general formula:

$$M_{2/n} \cdot Al_2O_3 \cdot xSiO_2 \cdot yH_2O$$

wherein M stands for a metal cation, n stands for the valency of the metal cation M, x is a number of at least 2, and y is a number larger than 0.

The basic structure of the zeolite comprises $SiO_4$ tetrahedrons having four oxygen atoms at apexes with the silicon atom being as the center and $AlO_4$ tetrahedrons having four oxygen atoms at apexes with the aluminum atom being as the center, where these $SiO_4$ tetrahedrons and $AlO_4$ tetrahedrons are regularly and three-dimensionally connected to one another while owning oxygen atoms jointly. A three-dimensional network structure having pores differing in the size and shape according to the manner of connection of the tetrahedrons can be provided. Negative charges of the $AlO_4$ tetrahedrons are electrically neutralized by coupling with cations of an alkali metal or alkaline earth metal. The thus-formed pores have a size of 2 to 10 angstroms or more, and the pore size can be changed by exchanging the metal cations connected to the $AlO_4$ tetrahedrons with other metal cations having a different size.

The zeolite is widely used as a dehydrating agent for a gas or liquid or as a molecular sieve for adsorbing and separating specific molecules by utilizing the above-mentioned pores. Furthermore, the zeolite is used on an industrial scale as a catalyst by utilizing properties as the solid acid.

The mordenite intended in the present invention is distinguishable from a natural mordenite and is ordinarily called "synthetic mordenite" or "large port mordenite". The crystal of the mordenite is of the rhombic system and is characterized by the lattice constants a, b and c of 18.1 angstroms, 20.4 angstroms and 7.5 angstroms, respectively. The pores have a channel of the 12-membered rings of oxygen atoms having a pore diameter of 6.7×7.0 angstroms and a channel of the 8-membered rings of oxygen atoms having a pore diameter of 2.9×5.7 angstroms.

The chemical composition of the mordenite has heretofore been represented by the following formula:

$$Na_2O \cdot Al_2O_3 \cdot 10SiO_2 \cdot 6H_2O$$

and the mordenite is characteristic over other zeolites in the point where the silica ratio is 10 and higher than the $SiO_2/Al_2O_3$ ratios in other zeolites. The mordenite is excellent in the heat resistance and acid resistance, and is widely used as an adsorbent or catalyst on an industrial scale.

It was found that as the $SiO_2/Al_2O_3$ molar ratio in the zeolite is increased, the heat resistance and acid resistance are improved and the catalytic properties as the solid acid are enhanced, and therefore, high-silica zeolites have recently attracted attention in the art. Accordingly, also in case of mordenites, development of a process capable of producing a product having a higher $SiO_2/Al_2O_3$ molar ratio on an industrial scale is eagerly desired.

Researches have recently been made on the synthesis of a mordenite type zeolite having an $SiO_2/Al_2O_3$ molar ratio higher than 10 (hereinafter referred to as "high-silica mordenite"), and several processes have been proposed. For example, Japanese Unexamined Patent Publication No. 55-95612 proposes a process in which neopentylamine is used as an organic mineralizer and a high-silica mordenite having an $SiO_2/Al_2O_3$ molar ratio of 17 is prepared. Furthermore, the Report of Ueda, Fukushima and Koizumi (Science of Clay, Volume 22, No. 1, 1982) discloses a process in which a high-silica mordenite having an $SiO_2/Al_2O_3$ molar ratio of 25.6 is prepared by using a quaternary ammonium salt as an organic mineralizer. These processes, however, are not preferred from the industrial viewpoint because use of expensive organic mineralizers is indispensable. The production of a high-silica mordenite without using an organic mineralizer has been tried. For example, the report of O. J. Whittemore, Jr., American Mineralogist, Volume 57, 1146–1151, 1972 discloses a process for preparing mordenite in which an alumina-silica gel having an $SiO_2/Al_2O_3$ molar ratio of 10.1 to 15.5 is prepared from a dilute aqueous solution of sodium silicate, a dilute aqueous solution of aluminum chloride and hydrochloric acid; and the alumina-silica gel is crystallized by heating the gel at 184° C. for 16 hours, whereby a mordenite having an $SiO_2/Al_2O_3$ molar ratio of 12 to 19.5 is obtained. The product obtained by this process has low crystallinity and low purity. It is presumed that this is because the alumina-silica gel used for crystallization contains little or no sodium and is of no homogeneous phase. Japanese Unexamined Patent Publication No. 56-160316 discloses a process in which a high-silica mordenite having an $SiO_2/Al_2O_3$ molar ratio of 15 to 25.8 is prepared by using an aqueous solution of sodium silicate and an aqueous solution of aluminum sulfate as starting materials. According to this process, sodium chloride is used in a large amount as an inorganic mineralizer for the synthesis of a high-silica mordenite. As the result of our investigations made on this process, it has been found that even if the synthesis is carried out faithfully according to the teaching of the above patent reference, a product cannot always be produced at a high efficiency, and that a high-silica mordenite having a high purity cannot be obtained unless reaction conditions such as the order of addition of the starting materials, the mixing speed, the stirring speed, the aging time and the crystallizing temperature are skillfully combined in a complicated manner.

SUMMARY OF THE INVENTION

It is a primary object of the present invention to provide a process in which a mordenite type zeolite having a high purity and a high $SiO_2/Al_2O_3$ molar ratio can advantageously be prepared without using an organic or inorganic mineralizer but by using cheap starting materials. If it is taken into account that even if the conventional processes can be carried out on bench scales, industrial working of the known processes has problems in the quality and operation and is disadvantageous from the economical viewpoint, it is quite obvious that the present invention has a great industrial significance.

In accordance with the present invention, there is provided a process for the preparation of a mordenite type zeolite, which comprises crystallizing a microgranular amorphous aluminosilicate of the homogeneous phase containing 3 to 14% by weight, expressed in terms of $Al_2O_3$ (calculated as the anhydride), of aluminum in an aqueous solution of an alkali metal hydroxide.

BRIEF DESCRIPTION OF THE DRAWINGS

FIG. 2 is an X-ray powder diffraction pattern of the dry product obtained in Example 1, which was determined by using a $K\alpha$ doublet of copper.

DESCRIPTION OF THE PREFERRED EMBODIMENTS

Figure 1:
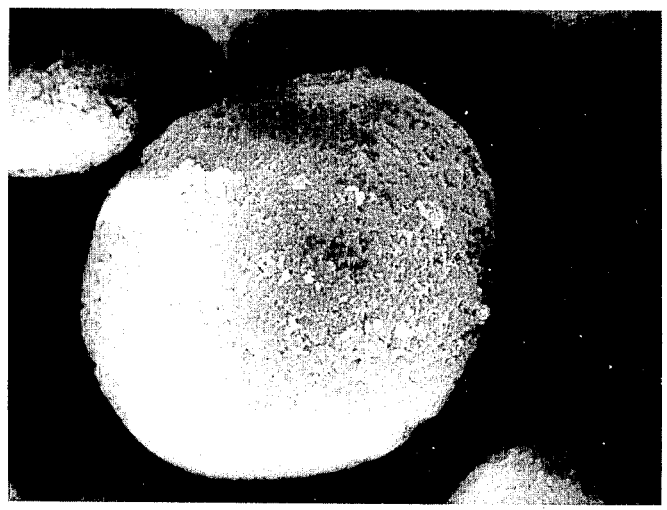
FIG. 1 is an electron microscope photograph of the microgranular amorphous aluminosilicate of the homogeneous phase obtained in Example 1.

Any of processes capable of providing a homogeneous aluminosilicate having a composition specified in the present invention can be adopted for the production of the specific homogeneous aluminosilicate used in the present invention. For example, this homogeneous aluminosilicate can be obtained by simultaneously and continuously reacting an aqueous solution of an alkali metal silicate with an aluminum-containing aqueous solution. The present invention will now be described with reference to this typical embodiment.

By the term "simultaneous and continuous reaction" in the above embodiment is meant a reaction which is carried out in such a manner that an aqueous solution of an alkali metal silicate and an aluminum-containing aqueous solution are simultaneously and continuously supplied to a reaction zone while perpetually maintaining a substantially constant ratio between the two solutions.

As the aqueous solution of the alkali metal silicate, there can be used an aqueous solution of lithium silicate, an aqueous solution of sodium silicate and an aqueous solution of potassium silicate. As the aluminum-containing aqueous solution, there are preferably used an aqueous solution of aluminum sulfate, an aqueous solution of aluminum nitrate, an aqueous solution of aluminum chloride, an aqueous solution of sodium aluminate and an aqueous solution of potassium aluminate. If necessary, a caustic alkali or mineral acid may be added to adjust the amount of an alkali or acid in an aqueous solution as mentioned above. A commercially available aqueous solution of an alkali metal silicate and a commercially available aqueous solution of a mineral acid salt of aluminum or an alkali metal aluminate may be used as the starting aqueous solutions. Moreover, aqueous solutions formed by dissolving a silica source such as siliceous sand or water-containing solid silicic acid by a caustic alkali or by dissolving an aluminum source such as aluminum hydroxide or activated alumina by a caustic alkali or mineral acid may be used.

The concentrations of both the starting aqueous solutions are not particularly critical, but optional concentrations may be adopted.

According to a most preferred embodiment of the above-mentioned process for preparing the homogeneous aluminosilicate, both the aqueous solutions are simultaneously and continuously supplied into an overflow-type reaction vessel provided with a stirrer to effect reaction between the aqueous solutions. The homogeneous aluminosilicate obtained according to this embodiment is composed of substantially spherical particles, and the majority of the particles have a size distributed in the range of 1 to 500 microns and the amount of fine particles having a size smaller than 1 micron is very small. In the present invention, it is preferred that a homogeneous aluminosilicate having a particle size of 10 to 100 microns be used. The ratio of the supplied solutions may optionally be determined according to the $SiO_2/Al_2O_3$ molar ratio of the intended mordenite type zeolite.

The resulting reaction mixture is in the form of a slurry having the formed spherical homogeneous aluminosilicate suspended therein. The pH value of the slurry is adjusted according to the amounts of the alkali and acid added to both the aqueous solutions. The pH value of the slurry is ordinarily adjusted to 5 to 9, preferably 6 to 8. The residence time of the slurry in the reaction vessel is preferably at least 3 minutes. By the residence time referred to herein is a meant a period of from the point the simultaneous and continuous supply of both the aqueus solutions into the reaction vessel to the point of the withdrawal of the slurry from the reaction vessel. If the residence time is shorter than 3 minutes, the proportion of fine particles having a size smaller than 1 micron is increased, and a high load is undesirably imposed on filtration and separation of the formed homogeneous aluminosilicate. If the residence time is 3 minutes or longer, the majority of the formed particles have a spherical shape the proportion of fine particles is drastically reduced. As the residence time is further prolonged, the particle size is increased and the hardness of the spherical particles is increased. Accordingly, the size and hardness of the formed spherical particles can be changed by controlling the residence time, and therefore, the reactivity of the homogeneous aluminoslicate can be adjusted according to the intended product.

According to another embodiment of the process for preparing the homogeneous aluminosilicate used in the present invention, the reaction slurry is not discharged but there as adopted a so-called batchwise continuous method in which both the aqueous solutions are simultaneously and continuously supplied at a constant ratio into the reaction vessel under stirring conditions. In this embodiment, both the aqueous solutions are not promptly added but it is preferred that both the aqueous solution be supplied over a period of at least 5 minutes, especially at least 30 minutes.

The reaction temperature adopted for the preparation of the homogeneous aluminosilicate is not particularly critical, and substantially spherical particles can be obtained at either a low temperature or a high temperature and no substantial difference of the reactivity is caused by the difference of the reaction temperature.

The present invention is characterized in that since the formed homogeneous aluminosilicate composed of substantially spherical particles is uniformly precipitated with a constant composition by simultaneously and continuously reacting both the aqueous solutions having an adjusted concentration at a constant ratio, formation of impurities due to the non-uniformity of the composition is completely prevented at the crystallizing step. For example, when one aqueous solution is added to the other aqueous solution according to the ordinary batchwise method, the product becomes pasty and highly viscous, and homogenization of the product is impossible, however strongly the stirring may be effected during reaction.

Even if an apparently uniform product is obtained by sufficient blending, microscopic non-uniformity of the composition cannot be avoided. This is the reason why the granular amorphous aluminosilicate used in the present invention is called "an aluminosilicate of the homogeneous phase". The technical essence of the present invention resides exactly in this point.

Furthermore, in case of the batchwise method, since the above-mentioned pasty product has a very high viscosity, the concentrations of the effective ingredients are limited to considerably low levels. In contrast, since the homogeneous aluminosilicate of the present invention is composed of spherical particles having a size of 1 to 500 microns, the viscosity of the reaction slurry is very low and strong stirring as required in the batchwise method is not necessary at all, and the slurry concentration can be drastically increased. Since the homogeneous aluminosilicate obtained according to the above-mentioned typical embodiment is obtained in the form of spherical particles having an appropriate size, solid-liquid separation and washing can be greatly facilitated. Moreover, since the water-removing property is good, even if the homogeneous aluminosilicate is used in the wet state, the water balance can be set in a broad range when the homogeneous aluminosilicate slurry is prepared and subjected to crystallization. This is another characteristic advantage of the present invention. It is preferred that the washed homogeneous aluminosilicate be used in the wet state, but of course, the homogeneous aluminoslicate may be used after drying.

Various homogeneous aluminosilicates differing in the composition can be obtained according to the above-mentioned process. However, in carrying out the present invention, it is indispensable that the homogeneous aluminosilicate should contain the aluminum component in an amount of 3 to 14% by weight as $Al_2O_3$ (calculated as the anhydride). A homogeneous aluminosilicate having an $Al_2O_3$ content (calculated as the anhydride) of 3 to 14% by weight can be obtained by adjusting the flow rates of both the aqueous solutions while taking the $SiO_2$ and $Al_2O_3$ concentrations in both the aqueous solutions into consideration. For example, if the $Al_2O_3$ concentration or flow rate of the aluminum-containing aqueous solution is increased, a homogeneous aluminosilicate having a higher $Al_2O_3$ content can be obtained. In the present invention, in order to increase the $SiO_2/Al_2O_3$ molar ratio in the mordenite type zeolite, it is preferred that the $Al_2O_3$ content in the homogeneous aluminosilicate be low. In order to obtain a mordenite type zeolite having a low $SiO_2/Al_2O_3$ molar ratio, it is preferred that a homogeneous aluminosilicate having a high $Al_2O_3$ content be used. As pointed out hereinbefore, in the present invention, the $SiO_2/Al_2O_3$ molar ratio in the formed mordenite type zeolite can freely be adjusted by controlling the $Al_2O_3$ content in the homogeneous aluminosilicate.

Crystallization is effected by heating the homogeneous aluminosilicate in an aqueous solution of an alkali metal hydroxide. At the crystallizing step, stirring is not indispensable, but in order to attain uniform conduction of heat in the entire system, stirring is preferred. As the aqueous solution of the alkali metal hydroxide, there are preferably used an aqueous solution of sodium hydroxide, an aqueous solution of potassium hydroxide and an aqueous solution of lithium hydroxide. A mixture of two or more of these aqueous solutions may be used. An aqueous solution of sodium hydroxide is especially preferred.

The concentration of the aqueous solution of the alkali metal hydroxide is 0.3 to 5% by weight as $M^IOH$ (in which $M^I$ stands for an alkali metal). If the $M^IOH$ concentration is higher than 5% by weight, analcime is simultaneously formed as an impurity. In contrast, if the $M^IOH$ concentration is lower than 0.3% by weight, crystallization becomes difficult. The amount of the aqueous solution of the alkali metal hydroxide is adjusted so that the weight ratio of the homogeneous aluminosilicate (as the anhydride) to the total amount of the starting slurry subjected to the crystallization is in the range of from 0.03 to 0.4.

The crystallization temperature is 130° to 50° C. If the crystallization temperature is lower than 130° C., crystallization becomes difficult. In contrast, if the crystallization temperature is higher than 250° C., analcime is simultaneously formed as an impurity.

The crystallization time varies according to the crystallization temperature, but the crystallization time is ordinarily 10 to 200 hours.

In the present invention, in order to obtain a high-slilica mordenite having a high purity, if the crystallization temperature is lower than 180° C., it is preferred that the molar ratio of the alkali metal hydroxide $M^IOH$ in the starting slurry to the aluminum component $Al_2O_3$ in the homogeneous aluminosilicate be in the range of from 2.4 to 22. If the crystallization temperature is higher than 180° C., it is preferred that the above molar ratio be in the range of from 2.2 to 18. In the case where the composition of the starting slurry is in the above-mentioned preferred range, if the content of the aluminum component $Al_2O_3$ in the homogeneous aluminosilicate is low, the molar ratio of $M^IOH$ to $Al_2O_3$ is preferably adjusted at a relatively high level. In contrast, if the $Al_2O_3$ content is high, it is preferred that the molar ratio of $M^IOH$ to $Al_2O_3$ is maintained at a relatively low level.

After completion of the crystallization, the formed crystal is subjected to solid-liquid separation and washing to remove the excessive alkali metal component left on the crystal. Then, the crystal is dried to obtain a mordenite type zeolite having a high purity and a high $SiO_2/Al_2O_3$ molar ratio.

The mordenite type zeolite obtained according to the present invention has a high $SiO_2/Al_2O_3$ molar ratio of 10 to 30, and this mordenite type zeolite can be used in various fields as an adsorbing separator or a catalyst in the as-obtained powdery form or after sintering and molding, or after ion exchange with an appropriate cation if necessary.

The present invention will now be described in detail with reference to the following Examples.

EXAMPLE 1

A sulfuric acid-acidified aqueous solution of aluminum sulfate ($Al_2O_3$=4.27 w/v %, $H_2SO_4$=33.29 w/v %) and an aqueous solution of sodium silicate (SiO$_2$=25 w/v %, Na$_2$O=8.20 w/v %, Al$_2$O$_3$=0.273 w/v %) were simultaneously and continuously supplied at constant rates of 0.5 l/hr and 1.5 l/hr, respectively, to an overflow type reaction vessel provided with a ordinary paddle agitator to effect reaction between both the aqueous solutions. An overflow opening was disposed so that 1 liter of the reaction liquid (slurry) was always contained in the reaction vessel while the excessive slurry was overflown, and the residence time of the reaction slurry was adjusted to 30 minutes. The pH value of the slurry was 6.4 and the reaction temperature was 33° C.

The slurry product overflown from the reaction vessel was subjected to solid-liquid separation by a centrifugal separator, and the solid product was washed with water until the SiO$_4^{--}$ ion was not detected in the washing filtrate, whereby a homogeneous aluminosilicate having a composition shown in Table 1 was obtained.

An electron microscope photograph of the so-obtained homogeneous aluminosilicate is shown in FIG. 1.

Then, 636.6 g of the homogeneous aluminosilicate was added to 1063.4 g of an aqueous solution of sodium hydroxide having a concentration of 2.25% by weight and the mixture was stirred to form a starting slurry.

The slurry was charged in an autoclave having a capacity of 2 liters, and the slurry was maintained at 165° C. under an autogeneous pressure with stirring for 48 hours to effect crystallization.

After completion of the crystallization, the product was separated from the mother liquor by filtration, washed with water and dried at 110° C. The chemical analysis of the dried product was carried out to obtain results shown in Table 2. The oxide molar ratio calculated from the results of the chemical analysis is as follows:

$$1.1Na_2O.Al_2O_3.21SiO_2.2.2H_2O$$

The X-ray powder diffraction pattern of the product is shown in FIG. 2, from which it can be confirmed that the product is a mordenite type zeolite having a high purity.

EXAMPLE 2

The procedures of Example 1 were repeated in the same manner except that a sulfuric acid-acidified aqueous solution of aluminum sulfate having a composition of Al$_2$O$_3$=1.73 w/v % and H$_2$SO$_4$=36.46 w/v % and an aqueous solution of sodium silicate having a composition of SiO$_2$=25.0 w/v %, Na$_2$O=8.20 w/v % and Al$_2$O$_3$= 0.275 w/v % were used instead of the aqueous solutions used in Example 1. A homogeneous aluminosilicate having a composition shown in Table 1 was obtained.

Then, 724.1 g of the homogeneous aluminosilicate was added to 975.9 g of an aqueous solution of sodium hydroxide having a concentration of 4.6% by weight, and the mixture was stirred to form a starting slurry. The slurry was charged in an autoclave having a capacity of 2 liters, and the slurry was maintained at 165° C. under an autogeneous pressure with stirring for 48 hours to effect crystallization.

The post treatments were carried out in the same manner as described in Example 1, and a product having a composition shown in Table 2 was obtained. The oxide molar ratio calculated from the results of the chemical analysis is as follows:

$$1.0Na_2O.Al_2O_3.26.5SiO_2.4.2H_2O$$

From the results of the powder X-ray diffractometry, it was confirmed that the product was a mordenite type zeolite having a high purity.

EXAMPLE 3

The procedures of Example 1 were repeated in the same manner except that a sulfuric acid-acidified aqueous solution of aluminum sulfate having a composition of Al$_2$O$_3$= 10.2 w/v % and H$_2$SO$_4$=29.4 w/v % and an aqueous solution of sodium silicate having a composition of SiO$_2$=28.0 w/v %, Na$_2$O=9.19 w/v % and Al$_2$O$_3$=0.308 w/v % were used instead of the aqueous solutions used in Example 1. A homogeneous aluminosilicate having a composition shown in Table 1 was obtained.

Then, 705.0 g of the homogeneous aluminosilicate was added to 975.0 g of an aqueous solution of sodium hydroxide having a concentration of 1.56% by weight, and the mixture was stirred to form a starting slurry. The slurry was charged in an autoclave having a capacity of 2 liters, and the slurry was maintained at 170° C. under a spontaneous pressure with stirring for 48 hours to effect crystallization.

The post treatments were carried out in the same manner as described in Example 1, and a product having a composition shown in Table 2 was obtained. The oxide molar ratio calculated from the results of the chemical analysis is as follows:

$$0.98Na_2O.Al_2O_3.10.9SiO_2.2.8H_2O$$

From the results of the powder X-ray diffractometry, it was confirmed that the product was a mordenite type zeolite having a high purity.

EXAMPLE 4

A starting slurry was prepared by incorporating 619.0 g of the homogeneous aluminosilicate obtained in Example 1 into 1081.0 g of an aqueous solution of sodium hydroxide having a concentrarion of 1.14% by weight and stirring the mixture. The slurry was charged in an autoclave having a capacity of 2 liters and was maintained at 200° C. under an autogeneous pressure with stirring for 72 hours to effect crystallization.

The post treatments were carried out in the same manner as described in Example 1, and a product having a composition shown in Table 2 was obtained. The oxide molar ratio calculated from the results of the chemical analysis is as follows:

$$1.04Na_2O.Al_2O_3.22.6SiO_2.3.4H_2O$$

From the results of the powder X-ray diffractometry, it was confirmed that the product was a mordenite type zeolite having a high purity.

EXAMPLE 5

The procedures of Example 1 were repeated in the same manner except that a sulfuric acid-acidified aqueous solution of aluminum sulfate having a composition of Al$_2$O$_3$=4.44 w/v % and H$_2$SO$_4$=26.23 w/v % and an aqueous solution of sodium silicate having a composition of SiO$_2$=20.0 w/v %, Na$_2$O=6.56 w/v % and Al$_2$O=0.22 w/v % were used instead of the aqueous solutions used in Example 1. A homogeneous aluminosilicate having a composition shown in Table 1 was obtained.

Then, 660.5 g of the homogeneous aluminosilicate was added to 1039.5 g of an aqueous solution of sodium hydroxide having a concentration of 4.0% by weight, and the mixture was stirred to form a starting slurry. The slurry was charged in an autoclave having a capacity of 2 liters, and the slurry was maintained at 150° C. under a spontaneous pressure with stirring for 50 hours to effect cyrstallization.

The post treatment were carried out in the same manner as described in Example 1, and a product having a composition shown in Table 2 was obtained. The oxide molar ratio calculated from the results of the chemical analysis is as follows:

1.1Na$_2$O.Al$_2$O$_3$.17.5SiO$_2$.4.2H$_2$O

From the results of the powder X-ray diffractometry, it was confirmed that the product was a mordenite type zeolite having a high purity.

COMPARATIVE EXAMPLE 1

The same starting material as used in Example 1 were used, and 3 liters of the aqueous solution of sodium silicate was added to 1 liter of the sulfuric acid-acidified aqueous solution of aluminum silicate with stirring over a period of 10 minutes to effect reaction. After completion of the addition, the mixture was further stirred for 1 hour to obtain a viscous pasty product. The pH value of the obtained slurry product was 6.3.

The slurry product was subjected to solid-liquid separation by centrifugal separation, and the recovered solid was washed until the SO$_4^-$ ion was not detected.

The product was amorphous sodium aluminosilicate having a composition shown in Table 1.

Then, 1090.5 g of the so-obtained amorphous sodium aluminosilicate was added to 609.5 g of an aqueous solution of sodium hydroxide having a concentration of 3.92% by weight.

The crystallization and post treatments were carried out in the same manner as described in Example 1 to obtain a dry product. From the results of the powder X-ray diffractometry, it was confirmed that the product was a mordenite type zeolite containing a ZSM-5 analogue simultaneously formed as a by-product.

COMPARATIVE EXAMPLE 2

In 1168 g of water was dissolved 49.1 g of solid aluminum sulfate (Al$_2$O$_3$=16.8% by weight, H$_2$SO$_4$=48.42% by weight), and 23.7 g of concentrated sulfuric acid having a concentration of 97% by weight was added to the solution to form a sulfuric acid-acidified aqueous solution of aluminum sulfate.

To the thus-formed aqueous solution was added 459.1 g of a commercially available aqueous solution of sodium silicate (SiO$_2$=28.46% by weight, Na$_2$O=9.34% by weight, Al$_2$O$_3$=0.117% by weight) with stirring over a period of 5 minutes to effect reaction. After completion of the addition, the mixture was further stirred for 1 hour to obtain a starting slurry.

The total amount of the slurry was charged in an autoclave having a capacity of 2 liters and crystallization was carried out at 180° C. under an autogeneous pressure for 48 hours with stirring.

The post treatments were carried out in the same manner as described in Example 1 to obtain a dry product. From the results of the powder X-ray diffractometry, it was confirmed that a very small amount of a mordenite type zeolite was formed but the majority of the product was amorphous.

COMPARATIVE EXAMPLE 3

The procedures of Example 1 were repeated in the same manner except that a sulfuric acid-acidified aqueous solution of aluminum sulfate having a composition of Al$_2$O$_3$=10.2 w/v % and H$_2$SO$_4$=29.4 w/v % and an aqueous solution of sodium silicate having a composition of SiO$_2$=16.0 w/v %, Na$_2$O=8.27 w/v % and Al$_2$O$_3$=0.176 w/v % were used instead of the aqueous solutions used in Example 1. A homogeneous aluminosilicate having a composition shown in Table 1 was obtained.

Then, 701.4 g of the homogeneous aluminosilicate was added to 998.6 g of an aqueous solution of sodium hydroxide having a concentration of 4.9% by weight, and the mixture was stirred to form a starting slurry.

The crystallization and post treatments were carried out in the same manner as described in Example 1 to obtain a dry product. From the results of the powder X-ray diffractometry, it was confirmed that no mordenite type zeolite was formed and all the product was amorphous.

COMPARATIVE EXAMPLE 4

The procedures of Example 1 were repeated in the same manner except that a sulfuric acid-acidified aqueous solution of aluminum sulfate having a composition of Al$_2$O$_3$=4.79 w/v % and H$_2$SO$_4$=34.01 w/v % and an aqueous solution of sodium silicate having a composition of SiO$_2$=25.0 w/v %, Na$_2$O=8.20 w/v % and Al$_2$O$_3$=0.103 w/v % were used instead of the aqueous solutions used in Example 1. A homogeneous aluminosilicate having a composition shown in Table 1 was obtained.

Then, 809.0 g of the homogeneous aluminosilicate was added to 891.0 g of an aqueous solution of sodium hydroxide having a concenrarion of 4.98% by weight, and the mixture was stirred to form a starting slurry.

The crystallization and post treatments were carried out in the same manner as described in Example 1 to obtain a dry product. From the results of the powder X-ray diffractometry, it was confirmed that a large amount of a ZSM-5 analogue was formed together with a mordenite.

COMPARATIVE EXAMPLE 5

To 1076.0 g of an aqueous solution of sodium hydroxide having a concentration of 6.2% by weight was added 624.0 g of the homogeneous aluminosilicate obtained in Example 1, and the mixture was stirred to obtain a starting slurry.

The crystallization and post treatments were carried out in the same manner as described in Example 1 to obtain a dry product. From the results of the powder X-ray diffractometry, it was confirmed that a small amount of a mordenite was formed but the product was composed mainly of analcime.

COMPARATIVE EXAMPLE 6

To 1056.9 g of an aqueous solution of sodium hydroxide having a concentration of 0.25% by weight was added 643.1 g of the homogeneous aluminosilicate obtained in Example 1, and the mixture was stirred to obtain a starting slurry.

The crystallization and post treatments were carried out in the same manner as described in Example 1 to obtain a dry product. From the results of the powder X-ray diffractometry, it was confirmed that no mordenite was formed and the product was amorphous.

TABLE 1

| | Chemical Composition (% by weight) of Amorphous Sodium Aluminosilicate | | | |
|---|---|---|---|---|
| | $Na_2O$ (dry base) | $Al_2O_3$ (dry base) | $SiO_2$ (dry base) | $H_2O$ (wet base) |
| Examples 1 and 4 and Comparative Examples 5 and 6 | 3.88 | 5.86 | 90.3 | 57.2 |
| Example 2 | 2.11 | 3.16 | 94.7 | 65.0 |
| Example 3 | 8.18 | 11.31 | 80.5 | 55.6 |
| Example 5 | 5.14 | 7.10 | 87.8 | 59.7 |
| Comparative Example 1 | 3.89 | 5.85 | 90.4 | 75.0 |
| Comparative Example 3 | 9.63 | 15.84 | 74.5 | 57.5 |
| Comparative Example 4 | 1.33 | 2.19 | 96.5 | 75.0 |

TABLE 2

| | Chemical Composition (% by weight) of Dry Product | | | |
|---|---|---|---|---|
| | $Na_2O$ | $Al_2O_3$ | $SiO_2$ | $H_2O$ |
| Example 1 | 4.64 | 6.94 | 85.73 | 2.69 |
| Example 2 | 3.39 | 5.57 | 86.91 | 4.13 |
| Example 3 | 7.01 | 11.76 | 75.42 | 5.81 |
| Example 4 | 4.07 | 6.44 | 85.63 | 3.86 |
| Example 5 | 5.26 | 7.87 | 81.04 | 5.83 |

We claim:
1. A process for the preparation of a mordenite zeolite which comprises the steps of:
   (1) simultaneously and continuously supplying an aqueous solution of an alkali metal silicate and an aluminum-containing aqueous solution at a substantially constant ratio into an overflow type reaction vessel with a stirrer and reacting the alkali metal silicate with the aluminum-containing aqueous solution while the pH of the reaction mixture is maintained at a value of 5 to 9, and the residence time of any portion of the reaction slurry in the reaction vessel is maintained at least three minutes, to obtain a microangular amorphous alumino-silicate of a homogeneous phase which is composed of, on the dry basis, 3.2 to 11.3% by weight of aluminum calculated as anhydrous $Al_2O_3$, 2.1 to 8.2% by weight of sodium calculated as anhydrous $Na_2O$ and the balance of silicon calculated as anhydrous $SiO_2$, the microangular amorphous aluminosilicate in the form of a spherical particle having a particle size of from 1 to 500 microns, and then
   (2) crystallizing the microangular amorphous aluminosilicate of the homogeneous phase at a temperature of 130° to 250° C. in an aqueous solution containing 0.3 to 5% by weight of sodium hydroxide.
2. A process according to claim 1, wherein the particle size of the microangular amorphous aluminosilicate is in the range of 10–100 microns.

* * * * *